United States Patent
Willimowski et al.

(10) Patent No.: US 7,067,212 B2
(45) Date of Patent: Jun. 27, 2006

(54) PRESSURE REGULATION OF A FUEL CELL HYDROGEN TANK SYSTEM

(75) Inventors: Peter Willimowski, Darmstadt (DE); Mirko Schwan, Mittenaar (DE)

(73) Assignee: General Motors Corporation, Detroit, MI (US)

( * ) Notice: Subject to any disclaimer, the term of this patent is extended or adjusted under 35 U.S.C. 154(b) by 407 days.

(21) Appl. No.: 10/316,144

(22) Filed: Dec. 10, 2002

(65) Prior Publication Data

US 2003/0175567 A1 Sep. 18, 2003

(30) Foreign Application Priority Data

Jan. 2, 2002 (DE) ................ 102 00 058

(51) Int. Cl.
  *H01M 8/04* (2006.01)
  *H01M 8/06* (2006.01)
(52) U.S. Cl. ................ 429/25; 429/19; 429/34
(58) Field of Classification Search ........... 429/19, 429/25, 34
See application file for complete search history.

(56) References Cited

U.S. PATENT DOCUMENTS

| | | | | |
|---|---|---|---|---|
| 4,302,217 | A | 11/1981 | Teitel | 48/180 |
| 5,976,725 | A * | 11/1999 | Gamo et al. | 429/25 |
| 6,576,361 | B1 * | 6/2003 | Barton | 429/25 |
| 2004/0121218 | A1 * | 6/2004 | Andrews | 429/38 |

FOREIGN PATENT DOCUMENTS

| | | |
|---|---|---|
| DE | 3014464 C2 | 9/1993 |
| DE | 69515132 T2 | 12/1994 |
| DE | 69302902 T2 | 12/1996 |
| WO | WO 93/18556 | 9/1993 |
| WO | WO 96/20508 | 12/1995 |

OTHER PUBLICATIONS

Translation of German Search Report dated Jan. 15, 2003.

* cited by examiner

*Primary Examiner*—Tracy Dove
(74) *Attorney, Agent, or Firm*—Cary W. Brooks

(57) ABSTRACT

A delivery system for the delivery of a gaseous fuel such as for example hydrogen, to a consumer, in particular to a fuel cell stack, wherein the fuel comes from a source with a higher pressure level, the delivery system comprising at least one mechanical pressure regulating valve which has a valve member biased by means of a spring and which is designed to regulate the fuel from the higher pressure level down to a lower pressure level which serves as the feed pressure for a control valve, wherein the control valve is connectable via a feed line to a consumer and determines the mass flow of the fuel coming from the source which is supplied to the consumer and wherein changes of the pressure prevailing at the consumer side of the control valve arise with power changes of the consumer, is characterized in that the said pressure prevailing at the consumer side of the control valve, or a value proportional to the latter or corresponding to it, can be supplied via a control line to the mechanical pressure regulating valve to supplement the spring bias acting on the valve member of the mechanical pressure regulating valve. In addition, a fuel cell system and a method for delivering a gaseous fuel are claimed.

2 Claims, 1 Drawing Sheet

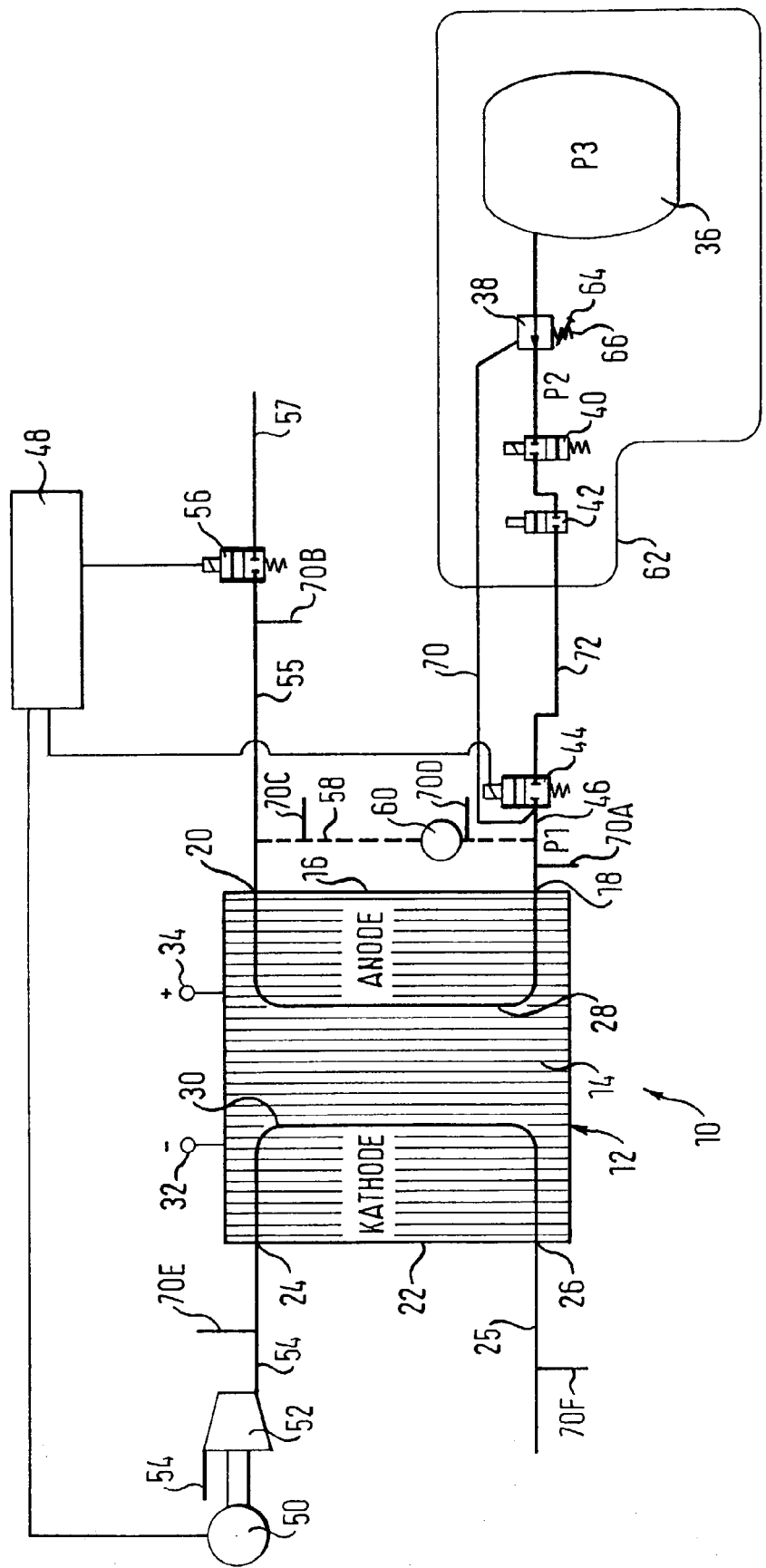

PRESSURE REGULATION OF A FUEL CELL HYDROGEN TANK SYSTEM

CROSS-REFERENCE TO RELATED APPLICATION

This application claims priority in and the benefit of German Application No. 102 00 058.1 filed 02 Jan. 2002.

TECHNICAL FIELD

The present invention relates to a delivery system for the delivery of a gaseous fuel such as for example hydrogen, to a consumer, in particular to a fuel cell stack, wherein the fuel comes from a source with a higher pressure level, the delivery system comprising at least one mechanical pressure regulating valve which has a valve member biased by a spring and which is designed to regulate the fuel from the higher pressure level down to a lower pressure level which serves as the feed pressure for a control valve, with the control valve being connectable via a feed line to a consumer and determining the mass flow of the fuel coming from the source which is supplied to the consumer and with changes of the pressure prevailing at the consumer side of the load valve arising with power changes of the consumer. The invention furthermore relates to a fuel cell system and also to a method of delivering a gaseous fuel.

BACKGROUND OF THE INVENTION

In the development of alternative drive concepts for automotive applications electrical propulsion in conjunction with a low temperature fuel cell system as an electrochemical energy converter has particularly increased in significance. The choice of the fuel has in this respect a substantial influence on the complexity of the fuel cell system. When using organic fuels such as for example methanol or gasoline, the system complexity increases because of the required reformation of fuel to form hydrogen-rich gas. The use of pure hydrogen results in a substantial simplification of the system.

In the following hydrogen will principally be referred to as the gaseous fuel, the invention is however not restricted to the use of hydrogen as the gaseous fuel but rather relates in principle to the supply of any desired gaseous fuels to any desired consumers which have a changing requirement for fuel in operation.

For the more detailed explanation of the invention a fuel cell system will be considered which is supplied with compressed hydrogen from a hydrogen tank. The hydrogen gas is supplied in dependence on the load to the fuel cell stack at the anode side. Oxygen or impure oxygen (air) is supplied to the cathode side of the fuel cell stack in dependence on the load. The desired load value results essentially from the performance demanded of the overall vehicle as selected by the driver (acceleration, braking etc.) and also on the power requirement of the electrical loads which are involved in the fuel cell system.

With a fuel cell system of this kind it is necessary to restrict the pressure of the hydrogen gas from a high pressure level in the tank to a lower pressure level for the fuel cell system at the outlet of the tank. The low pressure level is not a single absolute pressure point but rather a range of pressures at low level.

The known delivery systems for delivering a gaseous fuel have been designed hitherto so that at least one mechanically operating pressure regulating valve and also a control valve are provided connected in series between the source of the gaseous fuel with a higher pressure level and the fuel cell system. The task of the mechanically operating pressure valve has hitherto been to produce a constant feed pressure and the control valve is controlled in accordance with the load demands in order to control the mass flow of fuel supplied to the fuel cell stack.

The control valve had to be designed to handle the whole pressure range between the constant feed pressure of the mechanical pressure regulating valve and the smallest pressure prevailing at the fuel cell side of the valve. This leads to relatively high demands being placed on the quality of the control valve and its ability to respond.

SUMMARY OF THE INVENTION

The principal object of the present invention is to design a delivery system of the initially named kind and a fuel cell system and a method of delivering a gaseous fuel so that the demands made on the control valve are smaller, whereby favorably priced control valves can be used and a high quality control of the delivered fuel mass flow can nevertheless be achieved.

In order to satisfy this object there is provided an apparatus for the delivery of a gaseous fuel, such as hydrogen, to a consumer, wherein said fuel comes from a source having a higher pressure level (P3), said apparatus comprising at least one mechanical pressure regulating valve having a valve member and a spring for exerting a spring bias on said valve member, said pressure regulating valve being adapted to regulate the fuel from said higher pressure level (P3) down to a lower pressure level (P2), a control valve having an inlet adapted to receive fuel at said lower pressure (P2) and an outlet, a feed line adapted to connect said outlet of said control valve to a said consumer, said control valve being adapted to determine a fuel mass flow supplied from said source to a said consumer, there being a reduced pressure (P1) at said outlet of said control valve said reduced pressure (P1) changing with power changes of a said consumer and a control line for communicating one of said reduced pressure (P1) prevailing at said outlet of said control valve, a value proportional to said reduced pressure and a value corresponding to said reduced pressure to said mechanical pressure regulating valve to supplement said spring bias acting on the valve member of the mechanical pressure regulating valve.

Also in order to satisfy this object there is further more provided a fuel cell system comprising fuel cell stack consisting of a plurality of fuel cells and having an anode side with an anode inlet and an anode outlet and also a cathode side with a cathode inlet and a cathode outlet, a source of one of oxygen or air at said cathode side for the delivery of one of oxygen and air via said cathode inlet to said cathode side of said fuel cell stack, a source of a gaseous fuel for said anode side of said fuel cell stack, said source being adapted to deliver fuel at a higher pressure level, a feed-line which leads from said source of gaseous fuel to said anode inlet, at least one mechanical pressure regulating valve provided in said feed-line, said mechanical pressure regulating valve having a valve member and a spring for exerting a spring bias on said valve member and being adapted to regulate the fuel from said higher pressure level down to a lower pressure level, a control valve arranged downstream of said mechanical pressure regulating valve and adapted to determine a mass flow of fuel supplied to the anode side of said fuel cell stack from said source of gaseous fuel, an anode outlet valve which is connected to said anode outlet of the fuel cell stack, a control line which leads, from one of a point between the control valve and the anode exhaust gas valve at said anode side of said fuel cell stack and a point at said cathode side of said fuel cell stack downstream of said source of one of oxygen and air, to said mechanical pressure regulating valve and being connected to it to assist said spring bias.

Furthermore there is provided a method for delivering a gaseous fuel to a consumer said fuel coming from a source with a higher pressure level, there being a mechanical pressure regulating valve having a valve member and a spring for exerting a spring bias on said valve member, said mechanical pressure regulating valve being adapted to regulate said fuel from said higher pressure level down to a lower pressure level and a control valve for receiving fuel at said lower pressure as a feed pressure and being adapted to feed fuel at another pressure via a feed-line to said consumer, said control valve determining a mass flow of fuel supplied to said consumer and with changes of said another pressure prevailing at the consumer side of the control valve arising with power changes of the consumer, the method comprising communicating one of said another pressure prevailing at a consumer side of the control valve, a value proportional to said another pressure and a value corresponding to said another pressure to said mechanical pressure regulating valve to supplement said spring bias acting on said valve member of said mechanical pressure regulating valve.

Through the measure taken in accordance with the invention the pressure at the outlet of the mechanical pressure regulating valve is changed in accordance with the pressure changes downstream of the control valve in the same sense, whereby the pressure difference between the inlet side of the control valve and the outlet side of the control valve becomes smaller. In this way, the demands placed on the control valve, which is disposed between the mechanical regulating valve and the consumer or the fuel cell stack and which sets the required quantity of the gaseous fuel in dependence on the load, are reduced.

It is not absolutely essential for the control line to return the actual pressure at the outlet side of the control valve to the mechanical pressure regulating valve but rather it is sufficient to apply a pressure to the mechanical pressure regulating valve as a control pressure which behaves in accordance with the pressure level at the outlet of the control valve, i.e. changes in the same sense as the pressure level of the outlet of the control valve, preferably proportional to this pressure. The required adaptation of the outlet pressure of the mechanical pressure regulating valve to the outlet pressure at the outlet side of the control valve can be achieved through the specific design of the area which is effective with the additional pressure dependent biasing of the valve member in the mechanical pressure regulating valve. Accordingly, the control line can branch off from any desired point at the anode side of the fuel cell stack, for example at the outlet of the control valve itself, at the line between the control valve and the anode inlet of the fuel cell stack, from a distribution passage of the fuel cell stack at the anode side or from an outlet line which leads from the anode outlet of the fuel cell stack to a discharge valve, or indeed from a point in a return flow path between the anode outlet and the anode inlet of the fuel cell stack, if such a return flow path is provided.

Since the oxygen supply to the cathode side of the fuel cell system is likewise controlled in load dependent manner the control line can also be branched off from a point at the cathode side of the fuel cell stack downstream of the air compressor which is normally provided and which acts as the oxygen source for the fuel cell stack, providing the branch off takes place at a position where the pressure changes take place in phase with the pressure changes at the anode side of the fuel cell stack.

BRIEF DESCRIPTION OF THE DRAWINGS

The invention will now be explained in more detail with reference to embodiments and to the single drawing which shows a fuel cell system designed in accordance with the invention in schematic form.

DESCRIPTION OF THE PREFERRED EMBODIMENT

The reference numeral 10 designates the fuel cell system which includes a consumer in the form of a fuel cell stack 12. The fuel cell stack 12 consists of a plurality of individual fuel cells which are schematically designated by 14. The fuel cell stack 12 has an anode side 16 with an anode inlet 18 and an anode outlet 20 and also a cathode side 22 with a cathode inlet 24 and a cathode outlet 26.

In manner known per se each individual fuel cell 14 has an anode, a cathode and between them a membrane (not shown) with each of the so-called MEAs (Membrane Electrode Assemblies) consisting of an anode and cathode in the membrane between two so-called bipolar plates (likewise not shown). Flow passages for oxygen or atmospheric oxygen are provided between the one bipolar plate and the cathode while flow passages which serve for the supply of hydrogen to the anode are likewise provided between the other bipolar plate and the anode.

The flow passages at the anode side of the fuel cells are connected together so that all fuel cells can be simultaneously supplied with fuel via the anode inlet 18, and so that excess hydrogen and also other exhaust gases of the fuel cells, such as for example water in vapour form and nitrogen which comes from the atmospheric oxygen delivered to the cathode side, can be led out of the fuel cell stack at the anode outlet 20 via the line 55. The flow through the anodes of the connected together fuel cells it is indicated schematically in the Figure via the line 28. In similar manner the flow passages at the cathode side of the fuel cells are connected together to form a flow path 30 from the cathode inlet 24 to the cathode outlet in the fuel cell stack 12, with the exhaust gases arising at the cathode side 22 being able to be discharged into the atmosphere via the line 25. The bipolar plates of individual fuel cells 14 are connected in series or in parallel to one another. In operation a voltage arises at the two output terminals 32 and 34. This voltage is available as a power source for non-illustrated devices, for example for the propulsion of the motor vehicle in which the fuel cell system is incorporated, and also for the driving of other units, which are necessary for the operation of the fuel cell system.

The design of fuel cell stacks, or of the fuel cells contained therein is well known from diverse documents so that it is not necessary to go into more detail here on the specific design of the fuel cell stack.

It is important that a gaseous fuel has to be supplied to the anode side 16 of the fuel cell stack 12. When using hydrogen, the hydrogen can be taken from a source in the form of a hydrogen tank 36. More specifically the hydrogen comes from the hydrogen tank 36 via a mechanical pressure regulating valve 38 and also via a solenoid actuated switch-off valve 40 and a manually actuatable cut-off valve 42 to a control valve 44 which supplies the fresh hydrogen via a line 46 to the anode inlet 18 of the fuel cell stack 12.

In operation the control valve 44 is controlled, with the valves 40 and 42 being open, in accordance with the power required by the driver of the motor vehicle via a control 48 in order to feed the required mass flow of fresh hydrogen into the anode side of the fuel cell stack 12.

At the same time as the load dependent control of the control valve 44 by the control 48, the control 48 controls an electric motor 50 which drives a compressor 52 and feeds atmospheric oxygen via a line 54 and the cathode inlet 24 into the cathode side 22 of the fuel cell stack 12.

In the fuel cell stack 12 protons, which are delivered by the hydrogen that is supplied, migrate from the anode side 16 of the individual fuel cells through the membranes to the cathode side 22 and react with the atmospheric oxygen that is supplied at catalysts which are provided there in order to form water. This reaction leads to electrical potentials arising at the bipolar plates which serve in summed form for the power which can be taken off at the terminals 32 and 34.

During the electrochemical reaction in the individual fuel cells nitrogen molecules diffuse from the cathode side to the anode side and leave the anode side 16 via the anode outlet 20 together with the unconsumed hydrogen and water vapour. These anode exhaust gases can be discharged continuously via an anode exhaust valve 56. They are then normally supplied to a catalytic burner (not shown) for heat recovery via a line 57 and are reacted there with atmospheric oxygen for the production of heat. The exhaust gases present after the burner consisting of nitrogen and water vapour can be discharged without reservation to the atmosphere. The anode exhaust valve 56 can however also be discontinuously opened in order to discharge exhaust gases from the fuel cell stack 12 from time to time, for example, when the nitrogen concentration at the anode side of the fuel cell stack 12 has risen to a level at which the efficient operation of the fuel cell stack would suffer. It is however also known to supply the anode exhaust gases to the cathode side 22 of the fuel cell stack 12 so that the hydrogen component at the cathode side reacts directly with oxygen formed water and can be dispensed off in this manner. The present invention can also be used with such a system.

The possibility however also exists of providing a return line between the anode outlet 20 and the anode inlet 18 and indeed with the pump 60 which ensures that the return gases have a pressure level matched to that at the anode inlet 18 in order to maintain the flow. When using such a return flow a portion of the anode exhaust gases can be discharged either continuously or discontinuously via the anode exhaust valve 56 and the line 57.

In the drawing the hydrogen tank 36, the mechanical pressure regulating valve 38, the solenoid actuated switch-off valve 40 and also the manually actuatable cut-off valve 52 are shown in a frame 62. Since this part is frequently supplied by specialist suppliers it is known per se.

The mechanical pressure regulating valve 38 serves to regulate the higher pressure level P3 in the hydrogen tank 36, which can for example lie at 350 bar, down to a lower pressure level P2 which can for example lie only somewhat above 1 bar.

With a mechanical pressure regulating valve of this kind a spring 66 which exerts a force on a piston is pre-stressed via an adjusting screw 64. The piston then for example drives a valve member which cooperates with a counter member or valve seat (not shown) in the mechanical pressure regulating valve, which exerts the actual regulating function. Such mechanical pressure regulating valves normally have a connection to the atmosphere which serves as a reference pressure.

In some systems 62, such as can be obtained from a supplier, a second mechanical pressure regulating valve is provided at the tank side of the pressure regulating valve in series with the mechanical pressure regulating valve 38 shown here, since it is difficult to realize the reduction of the pressure P3 from about 350 bar to somewhat over 1 bar with one mechanical pressure regulating valve. When a second mechanical pressure regulating valve is provided it is known to direct a control line from the outlet side of the mechanical pressure regulating valve 38 to the reference input of the second pressure regulating valve, as will be later explained in more detail.

In accordance with the present invention a control line 70 leads from the outlet side of the control valve 44 to the reference pressure input of the pressure regulating valve 38 so that, when the pressure drops at the fuel cell side of the control valve 44 the reference pressure at the mechanical pressure regulating valve 38 likewise falls. Since the force from the reference inlet acts in the same direction as the spring this leads to a situation in which the outlet pressure P2 of the mechanical pressure regulating valve 38 and thus also the pressure at the inlet side of the control valve 44 likewise falls, whereby the pressure difference at the control valve 44 between its inlet and outlet sides is smaller. In this way the range of pressure difference which has to be controlled by the control valve 44 is always kept small, which reduces the requirements placed on the control valve 44. This does not signify that the pressure difference itself must be kept small but rather that the fluctuations of the pressure difference must always be kept small.

As stated the spring 66 which exerts a force on the piston is pre-stressed by the adjusting screw 64. The pressure P1 in the control or reference line 70 acts in the pressure regulating valve 38 in the same direction as the spring 66 with a force equal to P1×A where A is the effective area for the applied control pressure in the pressure regulating valve. The valve outlet pressure P2 acts opposite to the two forces (spring, pressure of the control line). Depending on the pressure a piston which represents the valve member or actuates it moves into an open or closed position.

In the operating mode with the electromagnetically actuatable switch-off valve 40 open and the cut-off valve 42 open the anodes of the fuel cells require hydrogen gas depending on the load requirement. This hydrogen gas is set by the control valve 44.

The connection of the control line 70 from the anode side 16 to the pressure regulating valve 38 has the advantage, that the pressure at the tank outlet P2 is not kept constant relative to the atmospheric pressure, but rather varies in accordance with the anode pressure P1. This signifies that the pressure difference (P2−P1) varies significantly less across the control valve 44 during the operation of the fuel cells than in the previous solution. As a result of the smaller variation in the pressure difference P2−P1 over the valve 44 the demands on the operating range of this valve drop which leads to cost reduction. Moreover, when using a two stage tank regulator, i.e. with two pressure regulating valves connected in series a more stable regulating behavior can also be expected. As stated the control line 70 can be connected to any desired point between the valve 56 and the valve 55, however the point directly at the outlet of the valve 44 is preferred.

As an alternative the control line 70 of the pressure regulating valve 38 can also be connected to any desired point at the cathode side of the fuel cell system. The pre-condition for this is, that the pressure level of the cathode changes in phase with the anode, i.e. the pressure difference between the cathode and the anode remains constant apart from sensor error.

Various possibilities exist for connecting the control line 70 to the fuel cell system and are indicated by stub lines which are designated with the reference numerals 70A, 70B, 70C, 70D, 70E and 70F. The stub line 70A lies directly at the anode inlet 18 of the fuel cell stack 12 whereas the stub line 70B lies directly in front of the anode exhaust valve 56. The stub line 70C is connected to the anode outlet side of the fuel cell stack 12 at the return line 65 while the stub line 70D is provided at the return line 58 after the pump 60. The stub line 70F is provided at the cathode inlet side of the fuel cell system 12 while the stub line 70G is provided at the cathode outlet side of the fuel cell stack and for example branches off from the outlet line 25.

In the known system with two pressure regulating valves connected in series the two pressure regulating valves communicate with one another via a control or reference line in order to achieve a dynamic pressure regulating behavior of the pressure P2 with varying hydrogen take-off via the line 72. In this connection the two pressure regulating valves operate as follows:

The second pressure regulating valve, i.e. the pressure regulating valve which is arranged closest to the fuel cell stack has, as in the pressure regulating valve 38 used in accordance with the invention, a control reference line which is however operated atmospherically. That is to say, that the second pressure stage cannot receive any information from the anode but rather utilizes the atmosphere as a reference measurement point and thus always regulates to a pressure difference relative to the atmosphere which is set by the spring bias. The consequence is that when using the known system with varying anode pressure the pressure difference across the control valve 44 varies and thus the working range of the control valve 44 is unnecessarily increased. The design of the invention avoids this disadvantage as discussed above.

The design of such mechanical pressure regulating valves 38 is known per se. One example of such a pressure regulating valve is known from the European patent specification EP 0 585 810 B1. There the reference connection 64 is connected either to the atmosphere or a higher pressure can be applied from a pump, if the installation of the pressure regulating valve makes this necessary. However in EP 0 585 510 B1 the reference connection is provided on the wrong side of the membrane for the purpose of the present invention. The valve could however be converted for the purpose of the present invention by arranging a depression capsule to which the control pressure P1 is supplied at the other side of the valve member from the spring and acts via a pin guided coaxially to the valve seat on the valve member coupled to the membrane and biased by the spring, both in the tension direction and also in the pressure direction.

The invention claimed is:

1. A fuel cell system comprising:
   a fuel cell stack consisting of a plurality of fuel cells and having an anode side with an anode inlet and an anode outlet and also a cathode side with a cathode inlet and a cathode outlet;
   a source of one of oxygen or air at said cathode side for the delivery of one of oxygen and air via said cathode inlet to said cathode side of said fuel cell stack;
   a source of a gaseous fuel for said anode side of said fuel cell stack, said source being adapted to deliver fuel at a higher pressure level;
   a feed-line which leads from said source of gaseous fuel to said anode inlet;
   at least one mechanical pressure regulating valve provided in said feed-line, said mechanical pressure regulating valve having a valve member and a spring for exerting a spring bias on said valve member and being adapted to regulate the fuel from said higher pressure level down to a lower pressure level;
   a control valve arranged downstream of said mechanical pressure regulating valve and adapted to determine a mass flow of fuel supplied to the anode side of said fuel cell stack from said source of gaseous fuel;
   an anode outlet valve which is connected to said anode outlet of the fuel cell stack; and
   a control line which leads, from one of a point between the control valve and the anode exhaust gas valve at said anode side of said fuel cell stack and a point at said cathode side of said fuel cell stack downstream of said source of one of oxygen and air, to said mechanical pressure regulating valve and being connected to it to assist said spring bias.

2. A fuel cell system in accordance with claim 1, there being a return line extending from a point upstream of said anode outlet valve to a point downstream of said control valve, said return line containing a pump and forming a return flow path, said control line leading from said return flow path to said mechanical pressure regulating valve.

* * * * *